US008037505B2

(12) United States Patent
Ou et al.

(10) Patent No.: US 8,037,505 B2
(45) Date of Patent: Oct. 11, 2011

(54) SYSTEM AND METHOD FOR PROVIDING POPULAR TV SHOWS ON DEMAND

(75) Inventors: Canhui Ou, Darriville, CA (US); Steven Gemelos, Cupertino, CA (US); Zhi Li, San Ramon, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1229 days.

(21) Appl. No.: 11/343,804

(22) Filed: Jan. 30, 2006

(65) Prior Publication Data
US 2007/0180465 A1 Aug. 2, 2007

(51) Int. Cl.
H04N 7/173 (2006.01)
H04N 9/00 (2006.01)
G06F 3/00 (2006.01)
G06Q 30/00 (2006.01)

(52) U.S. Cl. .................. 725/91; 725/9; 725/14; 725/39; 725/86; 725/87; 725/92; 725/100; 725/104; 705/14.44; 705/14.52; 705/14.53; 705/14.55

(58) Field of Classification Search .............. 725/32–36, 725/86–104, 9, 14, 39; 705/14.44, 14.52, 705/14.53, 14.55
See application file for complete search history.

(56) References Cited

U.S. PATENT DOCUMENTS

| 5,351,075 A | 9/1994 | Herz et al. |
| 5,930,473 A | 7/1999 | Teng et al. |
| 6,502,139 B1 | 12/2002 | Birk et al. |
| 6,850,252 B1 | 2/2005 | Hoffberg |
| 6,862,624 B2 | 3/2005 | Colby et al. |
| 6,915,528 B1 | 7/2005 | McKenna, Jr. |
| 6,941,508 B2 | 9/2005 | Abbott et al. |
| 7,478,414 B1 * | 1/2009 | Glusker et al. .................... 725/9 |
| 7,487,530 B2 * | 2/2009 | Azami ............................ 725/46 |
| 7,493,646 B2 * | 2/2009 | Ellis ............................... 725/87 |
| 2001/0027563 A1 * | 10/2001 | White et al. ..................... 725/46 |
| 2001/0046372 A1 | 11/2001 | Astle et al. |
| 2002/0078441 A1 * | 6/2002 | Drake et al. ...................... 725/9 |
| 2002/0124099 A1 | 9/2002 | Srinivasan et al. |
| 2003/0009718 A1 | 1/2003 | Wolfgang et al. |
| 2003/0051172 A1 | 3/2003 | Lordemann et al. |
| 2003/0061280 A1 | 3/2003 | Bulson et al. |

(Continued)

FOREIGN PATENT DOCUMENTS

CA 2321462 3/2002

(Continued)

OTHER PUBLICATIONS

"U.S. Appl. No. 11/316,066, Final Office Action mailed Jan. 16, 2009", 17 pgs.

(Continued)

*Primary Examiner* — Hoang-Vu A Nguyen Ba
(74) *Attorney, Agent, or Firm* — Pablo Meles; Guntin Meles & Gust, PLC (57) ABSTRACT

Various embodiments of the disclosed subject matter provide methods and systems to automatically identify popular television programs based on the viewing of broadcast television programs by at least some of the subscribers of a television distribution system. One or more of the popular television programs identified are stored and offered to one or more of the subscribers on-demand. Subscribers can obtain delivery of at least one of the stored popular television programs for viewing on a subscriber television.

32 Claims, 9 Drawing Sheets

U.S. PATENT DOCUMENTS

| | | | |
|---|---|---|---|
| 2003/0061362 A1 | 3/2003 | Qiu | |
| 2003/0069964 A1 | 4/2003 | Shteyn et al. | |
| 2003/0101451 A1 | 5/2003 | Bentolila et al. | |
| 2003/0177503 A1 | 9/2003 | Sull et al. | |
| 2003/0200548 A1 | 10/2003 | Baran et al. | |
| 2003/0208767 A1 | 11/2003 | Williamson et al. | |
| 2004/0128317 A1 | 7/2004 | Sull et al. | |
| 2004/0226051 A1 | 11/2004 | Carney et al. | |
| 2004/0268410 A1* | 12/2004 | Barton et al. | 725/119 |
| 2005/0022242 A1 | 1/2005 | Rosetti et al. | |
| 2005/0028206 A1 | 2/2005 | Cameron et al. | |
| 2005/0086687 A1* | 4/2005 | Omoigui | 725/35 |
| 2005/0155079 A1 | 7/2005 | Chen | |
| 2005/0163476 A1 | 7/2005 | Kosugi et al. | |
| 2005/0165849 A1 | 7/2005 | Moradi et al. | |
| 2005/0177853 A1 | 8/2005 | Williams et al. | |
| 2005/0193010 A1 | 9/2005 | DeShan et al. | |
| 2005/0195901 A1 | 9/2005 | Pohjola et al. | |
| 2005/0275758 A1* | 12/2005 | McEvilly et al. | 348/725 |
| 2005/0278741 A1* | 12/2005 | Robarts et al. | 725/46 |
| 2006/0029093 A1 | 2/2006 | Van | |
| 2006/0262220 A1 | 11/2006 | Nakamura et al. | |
| 2007/0143787 A1* | 6/2007 | Cankaya | 725/34 |
| 2007/0143809 A1 | 6/2007 | Chen et al. | |
| 2007/0143813 A1 | 6/2007 | Chen et al. | |

FOREIGN PATENT DOCUMENTS

| | | |
|---|---|---|
| CN | 1494264 | 5/2004 |
| JP | 2002342197 | 11/2002 |
| JP | 2003224801 | 8/2003 |
| JP | 2004312413 | 11/2004 |
| WO | WO-0184336 | 11/2001 |
| WO | WO-2005074245 | 8/2005 |
| WO | WO-2007076041 A2 | 7/2007 |
| WO | WO-2007076041 A3 | 7/2007 |
| WO | WO-2007076042 A2 | 7/2007 |
| WO | WO-2007076042 A3 | 7/2007 |
| WO | WO-03067594 A1 | 8/2007 |

OTHER PUBLICATIONS

"U.S. Appl. No. 11/316,066, Response filed Mar. 16, 2009 to Final Office Action mailed Jan. 16, 2009", 9 pgs.

"U.S. Appl. No. 11/316,537, Final Office Action mailed Apr. 2, 2009", 15 pgs.

"U.S. Appl. No. 11/316,537, Response filed Feb. 29, 2008 to Non-Final Office Action mailed Aug. 27, 2008", 10 pgs.

"U.S. Appl. No. 11/316,066 response filed Nov. 14, 2008 to Non-Final Office Action mailed Aug. 14, 2008", 12 pgs.

"U.S. Appl. No. 11/316,066 Non-Final Office Action Mailed Aug. 14, 2008", OARN, 17 Pgs.

"U.S. Appl. No. 11/316,537, Non-Final Office Action mailed Aug. 27, 2008", 15 pgs.

"International Application Serial No. PCT/2006/049091, International Preliminary Report on Patentability mailed Jul. 3, 2008", 6 pgs.

"International Application Serial No. PCT/US06/49091, International Search Report Oct. 25, 2007", 5 pgs.

"International Application Serial No. PCT/US06/49091, International Search Report mailed Oct. 25, 2007", 5 pgs.

"International Application Serial No. PCT/US06/49091, Written Opinion Oct. 25, 2007", 6 pgs.

"International Application Serial No. PCT/US06/49091, Written Opinion mailed Oct. 25, 2007", 4 pgs.

"International Application Serial No. PCT/US06/49092, Intenational Preliminary Report on Patentability mailed Jul. 3, 2008", 8 pgs.

"International Application Serial No. PCT/US06/49092, International Search Report mailed Oct. 23, 2007", 5 pgs.

"International Application Serial No. PCT/US06/49092, Written Opinion mailed Oct. 23, 2007", 6 pgs.

Acharya, Swarup, et al., "Scheduling On-demand Broadcasts: New Metrics and Algorithms", *Proc. of Fourth Annual ACM/IEEE International Conference on Mobile Computing and Networking*, (1998),1-12.

Chang, Ray-I, et al., "An Effective and Efficient Traffic Smoothing Scheme for Delivery of Online VBR Media Streams", *INFOCOM '99, Eighteenth Annual Joint Conference of the IEEE Computer and Communications Societies. Proceedings, IEEE*, (Mar. 1999),447-454.

Freyhult, Stefan, "Streaming Video on IP Networks", *Master's Thesis in Computer Science at the School of Computer Science and Engineering, Royal Institute of Technology*, 2004, http://www.nada.kth.se/utbildning/grukth/exjobb/rapportlistor/2004/rapporter04/freyhult_stefan_04024.pdf,(Observed Oct. 10, 2005),35 pgs.

Hammad, Moustafa A., "A Stream Database for Sensor Applications", *Purdue University Department of Computer Sciences Technical Report CSD TR#02-009*, (May 2002),1-36.

Hilt, Volker, et al., "The Recording of Interactive Media Streams Using a Common Framework", *Praktische Informatik IV*; L15, 16; D-68131, (1998),1-15.

Hua, Kien A., et al., "Video Delivery Technologies for Large-Scale Deployment of Multimedia Applications", http://www.csee.umbc.edu/~pmundur/courses/CMSC691M-04/nimish-hua.pdf, (Observed Oct. 1, 2005),13 pgs.

Kozamernik, Frank, et al., "Will Broadband TV Shape the Future of Broadcasting", *EBU Technical Review*, http://www.ebu.ch/en/technical/trev/trev_302-kozamernik.pdf,(Apr. 2005),1-21.

McCurdy, Neil J., et al., "A systems architecture for ubiquitous video", *Proceedings of the 3rd international conference on Mobile systems, applications, and services*, (2005),1-14.

Park, Soo-Jin, et al., "Fiber-to-the-Home Services Based on Wavelength-Division-Multiplexing", *Journal of Lightwave Technology*, 22(11), http://photonet.kaist.ac.kr/homepage/paper/paper1/file/47.pdf,(Nov. 2004), 10 pgs.

Rainer, Leo, et al., "What's on the T.V.: Trends in U.S. Set-Top Box Energy Use, Design, and Regulation", *BNET White Paper*, http://library.iea.org/textbase/papers/2004/am_stb.pdf,(Sep. 2004),1-12.

Sen, Subhabrata, et al., "Proxy Prefix Caching for Multimedia Streams", http://pads1.cs.nthu.edu.tw/~liaoweik/download/proxy/Sen_ProxyPrefix_Infocom99.TR98-27.pdf, (Observed Oct. 11, 2005),26 pgs.

\* cited by examiner

SYSTEM AND METHOD FOR PROVIDING POPULAR TV SHOWS ON DEMAND

TECHNICAL FIELD

The disclosed subject matter relates to the field of television distribution and programming, and more particularly to methods and systems including recording and/or time shifting television content.

CROSS-RELATED APPLICATIONS

This application is related to U.S. application Ser. No. 11/316,066, entitled, "SYSTEM AND METHOD FOR RECORDING AND TIME-SHIFTING PROGRAMMING IN A TELEVISION DISTRIBUTION SYSTEM USING POLICIES," by Zesen Chen, Peter Chou, Sean Chen, Brian Gonsalves and Don Smith, filed on Dec. 21, 2005, and assigned to SBC Knowledge Ventures, L.P., and U.S. application Ser. No. 11/316,537, "SYSTEM AND METHOD FOR RECORDING AND TIME-SHIFTING PROGRAMMING IN A TELEVISION DISTRIBUTION SYSTEM WITH LIMITED CONTENT RETENTION" by Zesen Chen, Peter Chou, Sean Chen, and Brian Gonsalves, filed on Dec. 21, 2005, and assigned to SBC Knowledge Ventures, L.P.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006, SBC Knowledge Ventures L.P. All Rights Reserved.

BACKGROUND

Subscribers to broadcast television sometimes desire to view television programming at times other than when the programming is broadcast. Digital video recorders (DVRs) use high capacity magnetic disk storage to record and time shift television (TV) programs. These DVR devices have leveraged the growth of microprocessor technology and added smart functionality such as program guides and automated recordings by schedule or by title of the desired television program. Further, these devices have changed the way people watch television. The consumer now worries less about the scheduling of television programs, relying instead on the DVR to record shows of interest so that the consumer can watch shows at their leisure. As successful as DVR devices have been, however, typical existing models have certain limitations such as, but not limited to, the inability to simultaneously record multiple programs, limited storage capacity, and the need for users to remember to set the DVR to record the television programs of their choice.

DETAILED DESCRIPTION

In the following detailed description, reference is made to the accompanying drawings that form a part hereof, and in which are shown by way of illustration, specific embodiments in which the disclosed subject matter can be practiced. It is understood that other embodiments may be utilized and structural changes may be made without departing from the scope of the disclosed subject matter. The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

As described further below, according to various example embodiments of the disclosed subject matter described herein, there is provided methods and systems to provide time shifting of television programming, including but not limited to methods and systems to manage the storage requirements on system servers used to record programming for later viewing by subscribers. As described in more detail below, in one example embodiment, the systems and methods provide for identifying popular television programs, recording the identified programming on one or more servers in the distribution system remotely from the subscribers, and delivering the recorded programming to viewers on demand to enable time-shifted delivery of the recorded programming at the leisure of the subscribers.

Figure 1:
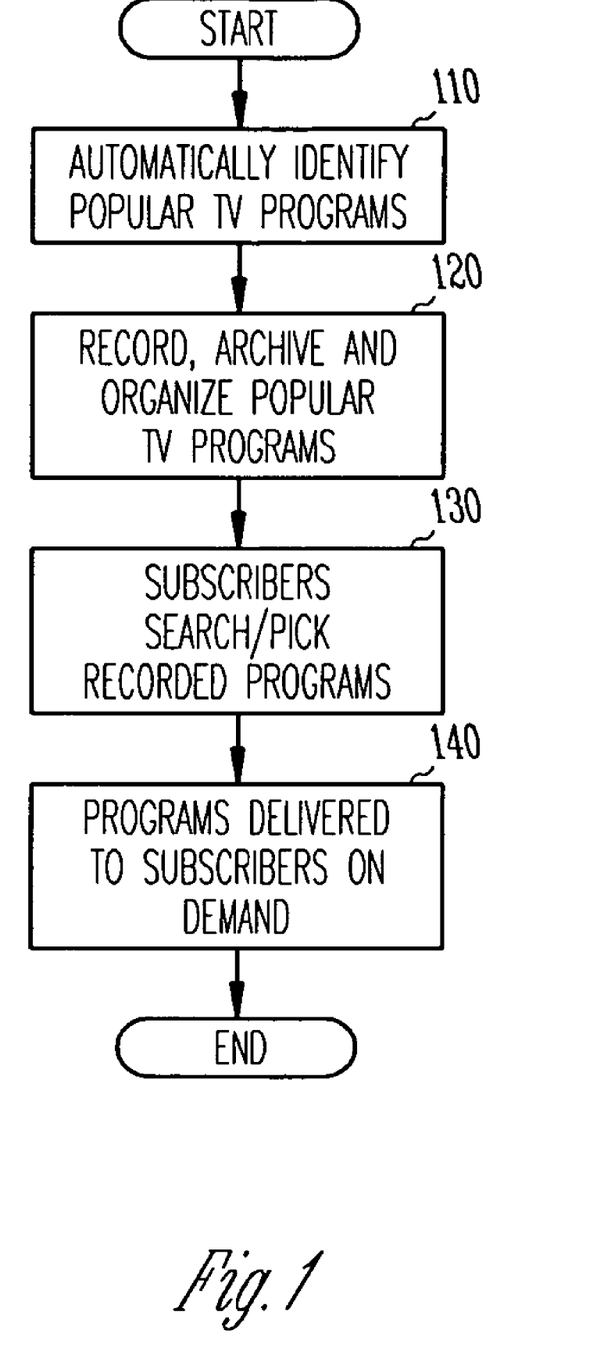
FIG. 1 illustrates a method in accordance with one example embodiment of the disclosed subject matter hereof.

Example embodiments of the disclosed subject matter, as illustrated in the simplified block diagram 100 of FIG. 1, provide a network-based DVR system and a methodology to: (1) automatically identify 110 popular TV programs broadcast to subscribers of a television distribution system; (2) record, archive, and organize 120 the identified programs remotely from the subscribers in the television distribution system; (3) provide 130 subscribers the ability to search the network archive for recorded programs; and (4) deliver 140 the programs to the subscribers on demand so they can watch the programs at their leisure. The service can be provided, for example but not by way of limitation, on a subscription basis, a pay-per-view basis, or both. As provided by example embodiments of the disclosed subject matter, a network-based DVR system enables TV programs to be stored on the network allowing subscribers to view the program at their leisure. Accordingly, the systems and methods of the disclosed subject matter mitigate the practical limitations imposed by DVRs and IPTV infrastructure.

Figure 2:
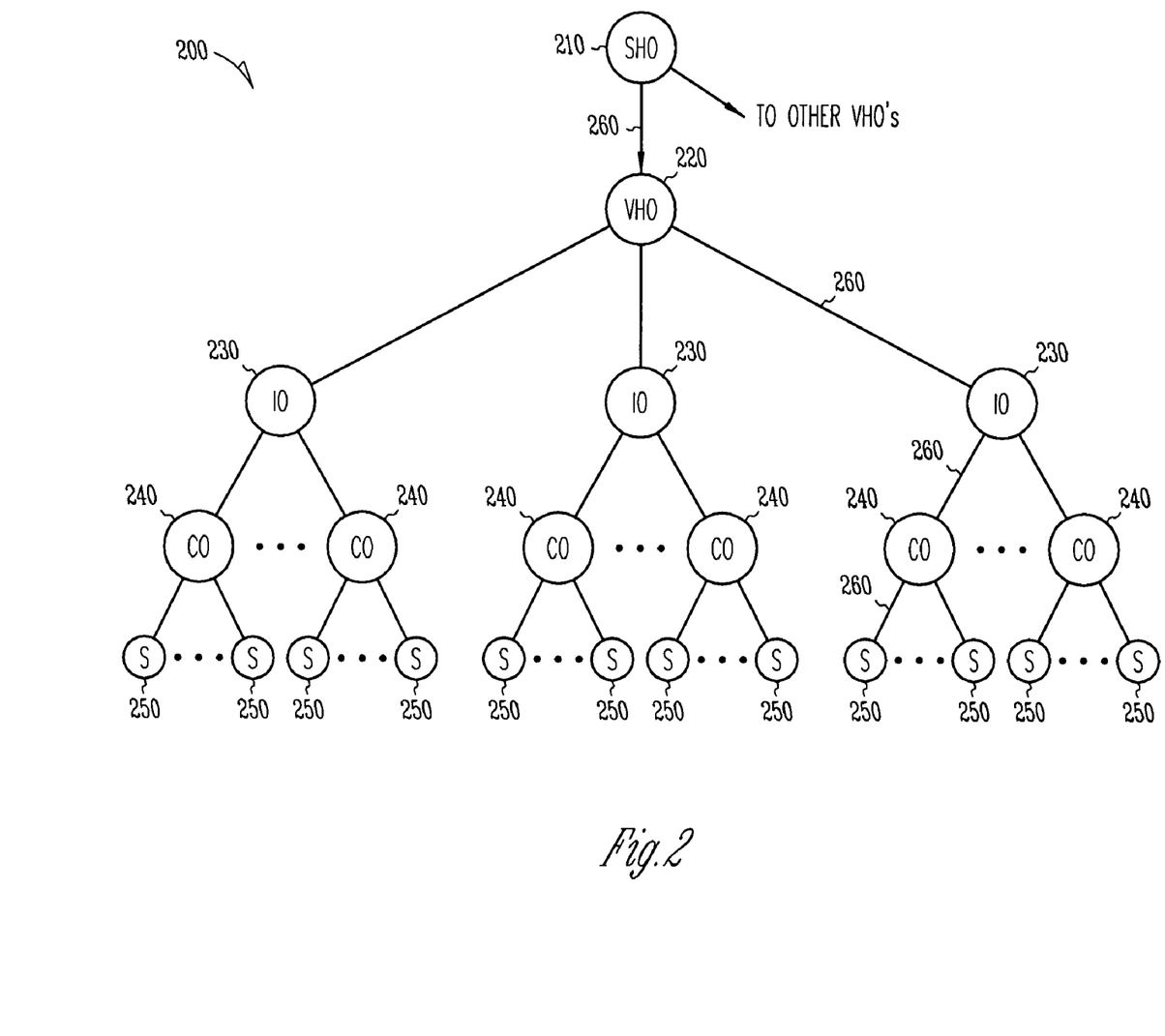
FIGS. 2, 3, and 4 illustrate an IPTV network in accordance with one example embodiment of the disclosed subject matter hereof.
Figure 3:
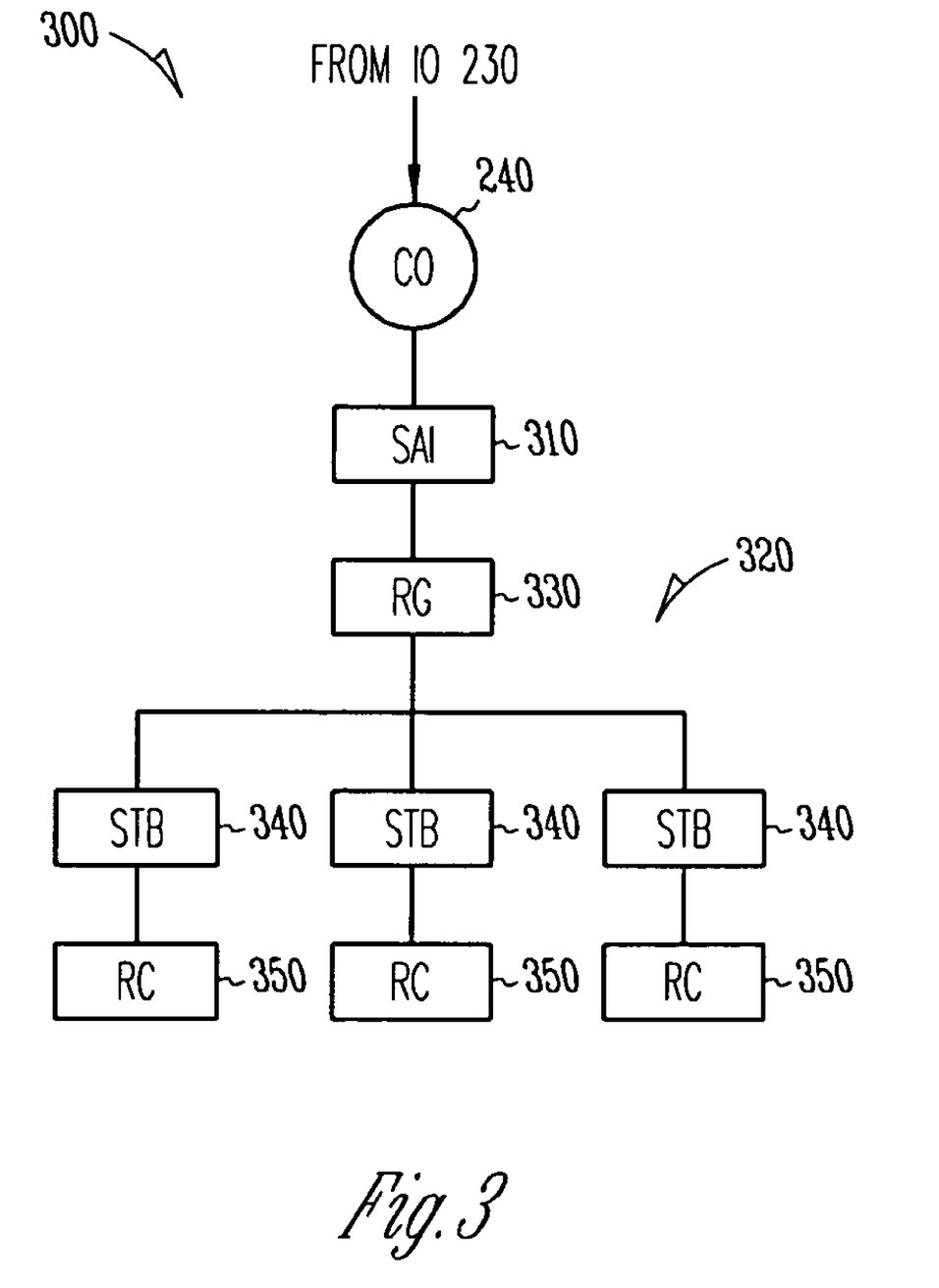
Figure 4:
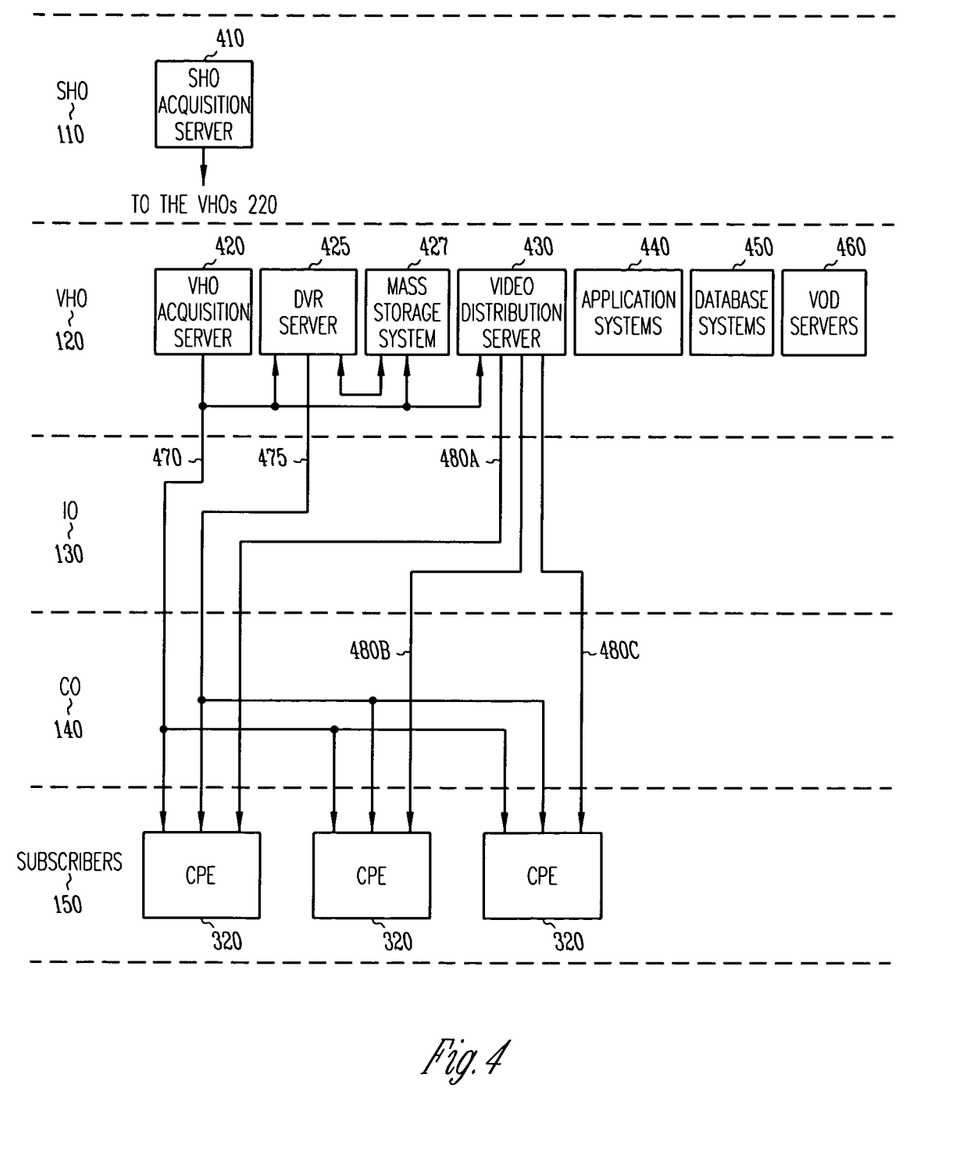

Referring now to FIGS. 2, 3, and 4, there is illustrated one example embodiment of a television distribution system or network 200, using IPTV technology in this example but not limited thereto, adapted to provide, among other things, the time shifting and storage management features of the disclosed subject matter. As shown in FIG. 2, the network 200 may include a super hub office (SHO) 210 for acquisition and encoding of video content, one or more video hub offices (VHO) 220 in each demographic market area (DMA), one or more intermediate offices (IO) 230, one or more central offices (CO) 240 located in each metropolitan area, and, finally, the subscribers (S) 250, who may be located in single or multiple dwelling units. In one example embodiment, the network 200 may be connected through a plurality of high speed communication links 260 using physical transport layers such as fiber, cable, twisted pair, air, or other media.

In one example embodiment of the IPTV video delivery system, the SHO 210 distributes content to one or more VHOs 220 which may be spread across a wide geographic territory, such as an entire country. The SHO 210 may, for example, be in a central location for acquisition and aggregation of national-level broadcast TV (or linear) programming. A redundant SHO 210 may be provided for backup in case of failure. The SHO 210 may also provide the central point of on-demand content acquisition and insertion into the IPTV network. Linear programming may be received at the SHO 210 via satellite and processed for delivery to the VHO 220. On demand content may be received from various sources and processed/encoded to codec and bit-rate requirements for the communication network for transmission to the VHO 220 over the high speed communication links. The VHOs 220 are the video distribution points within each demographic market area (DMA) or geographic region.

Referring now to FIG. 3, there is illustrated, in more detail, an example network architecture 300 between the CO 240 and the subscriber 250. A serving area interface (SAI) 310 may be connected to the CO 240. SAI 310 may, for example, be located in a weather-proof enclosure proximate the subscriber 250 premises, and may include fiber-to-the-node (FTTN) equipment. FTTN equipment may also be located in the CO 240. Customer premise equipment (CPE) 320 includes, for example, a network interface device (NID) and a residential gateway (RG) 330, with a built-in very-high-bit-rate digital subscriber loop (VDSL) modem or optical network termination (ONT). In either case the RG 330 may be connected to the rest of the home set top boxes (STB) 340 via an internal network such as an Ethernet. Each STB 340 has an associated remote control (RC) 350 which provides data entry to the STB 340 to control the IPTV selections from the IPTV data streams.

Referring now to FIG. 4, which illustrates one example embodiment of a configuration according to the disclosed subject matter, a SHO acquisition server 410 may be used to acquire national content that may be distributed towards the VHO 220. In an alternative embodiment, live television content may be acquired using an acquisition server in the VHO 220. In this configuration, the VHO 220 may include a live television acquisition server 420 and a video distribution server 430, which forward the live television and/or other content toward the subscribers 250 through the intermediate offices (IOs) 230 and the central office (CO) 240. A VHO 220 may also include application systems 440, regional subscriber 250 database systems 450, and VOD servers 460. The COs 240 are connected to the IOs 230 to further distribute traffic towards the subscribers 250. Traffic may reach the subscribers 250 at least partially via either fiber to the node (FTTN) or fiber to the premises (FTTP), or by other types of transmission medium.

As also illustrated in FIG. 4, acquisition server 420 may distribute a plurality of live television programs, each typically associated with a television "channel," using a multicast IP protocol data stream 470 through the IOs 230 and COs 240 to the subscribers 250. The routers, switches, and other network elements that would normally be present in the IOs 230 and COs 240 are not shown in FIG. 4 in order to simplify the drawing. The number of programs or channels sent in the multicast stream may, without limitation, range up to 800 channels or more using present technology, with it being understood that advances in technology may allow many more channels to be sent. The multicast protocol allows for efficient distribution of these signals to a large number of end subscribers 250. In addition, the video distribution server 430 receives the multicast data stream 470, and distributes selected ones of the live television signals, extracted from the stream 470, using a unicast data stream 480a, 480b, or 480c, to specific subscribers 250. In this embodiment, video distribution server 430 may provide a unicast stream, for example in burst mode, of a specific live television channel to any of the subscribers 250 served by the VHO 220. The burst mode instant channel change data stream can be discontinued once the subscriber's 250 system is loaded with enough TV program data so that the multicast stream can "catch up" and take over supplying the program data stream in the multicast mode for more extended term viewing by the subscriber 250.

Also provided in the VHO 220, or alternatively at another distribution point in the IPTV network such as the SHO 210, IO 230, or CO 240, is an additional digital video recorder (DVR) server 425 that acquires live television programming, records the programming/channels in digital form, and distributes the recorded content to subscribers 250 using a unicast data stream in the same manner as server 430. DVR server 425 may be connected to, in one example embodiment, one or more mass storage devices or systems 427, such as magnetic disk drives or optical recording systems. In addition, DVR server 425 includes software 426 to support interaction with subscribers 250 through STB 340. For example, subscribers 250 can, interact with the DVR server 425 using a remote control 350 and an STB 340 to request programming be saved, view saved programming on their own list of saved content, and request delivery of the saved content to them from DVR server 425. Alternatively, in another embodiment, the functions described for DVR server 425 may be performed by a single acquisition server such as server 420 or VOD server 460, and DVR server 425 can be eliminated in whole or in part. The subscribers 250 may request content recorded on DVR server 425, which is delivered, in one example embodiment, with unicast data streams 490A, 490B, or 490C.

According to one embodiment, access to regularly scheduled programming on the television channels, or alternatively access to programming recorded under the control of DVR server 425, may be controlled by an STB 340 in the subscriber 250's premises. Thus, in one example embodiment, each subscriber 250 receives live television programs from the video acquisition server 420 based on IP-based multicasting services, while the video distribution servers 430 are used to provide subscribers 250 "instant" channel change and recover video packet losses to maintain acceptable quality of service. Further, the DVR server 425 provides recorded television programming upon demand by subscribers 250 as more fully described herein.

According to one example embodiment, TV shows may be monitored on the subscriber 250 side, for example in the STB 340. On the subscriber 250 side, the STB 340 receive subscriber 250-initiated control commands from, for example the RC 350, such as channel changes, video-on-demand program ordering, and other control information. This information can be used to collect accurate information of all the subscribers 250's TV viewing information by querying each individual subscriber's 250 STB 340. Alternatively, if such statistics are not available from the STB 340, subscriber 250 viewing information can be obtained from the RG 330 based on IP multicast information obtained from the RG 330. In another embodiment, the subscriber 250 viewing information may be obtained from the VHO 220 based on, for example, channel-change requests sent from the STB 340 to the video distribution server 430 in VHO 220. As a result, subscriber 250 channel-change information can be collected from the video distribution server 430 and used to determine the overall viewing of a particular show. Collection of program viewing information may be orchestrated by software 426 in DVR server 425, or by other software in the TV distribution system.

Figure 5:
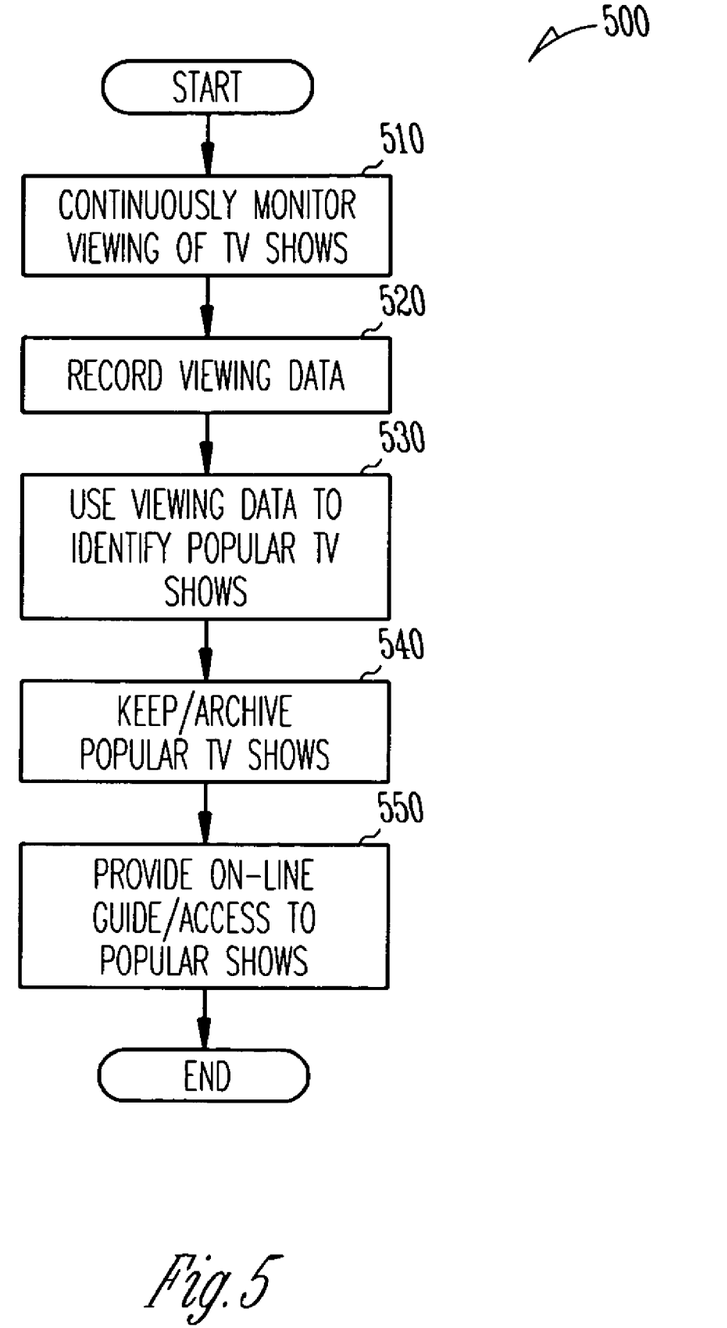
FIGS. 5-8 illustrate various example embodiments of methods and systems for TV shows on demand in accordance with the disclosed subject matter.

Referring now to FIG. 5, there is illustrated an example embodiment 500 of a method according to the disclosed subject matter. The number of viewers watching each show on the distribution network, or a portion thereof, is continuously monitored 510 in real time, or near real time, recorded 520, and used 530 to identify popular TV shows where, in one example embodiment, the number of viewers per show represent the actual number of total viewers, and in another embodiment, a sample of the total viewers. According to one example embodiment, the number of viewers per show can be determined continuously from either subscriber 250 side or network side. The popular TV shows are then archived 540 and a list or guide for popular TV shows are made accessible 550 to subscribers 250 to view. According to still another example embodiment, once the number of viewers per show is determined, the shows can be ranked in order, for example all the shows within a certain time period (e.g., an hour), to find the N most popular shows in that period, where N is an integer and a configurable system parameter.

Figure 6:
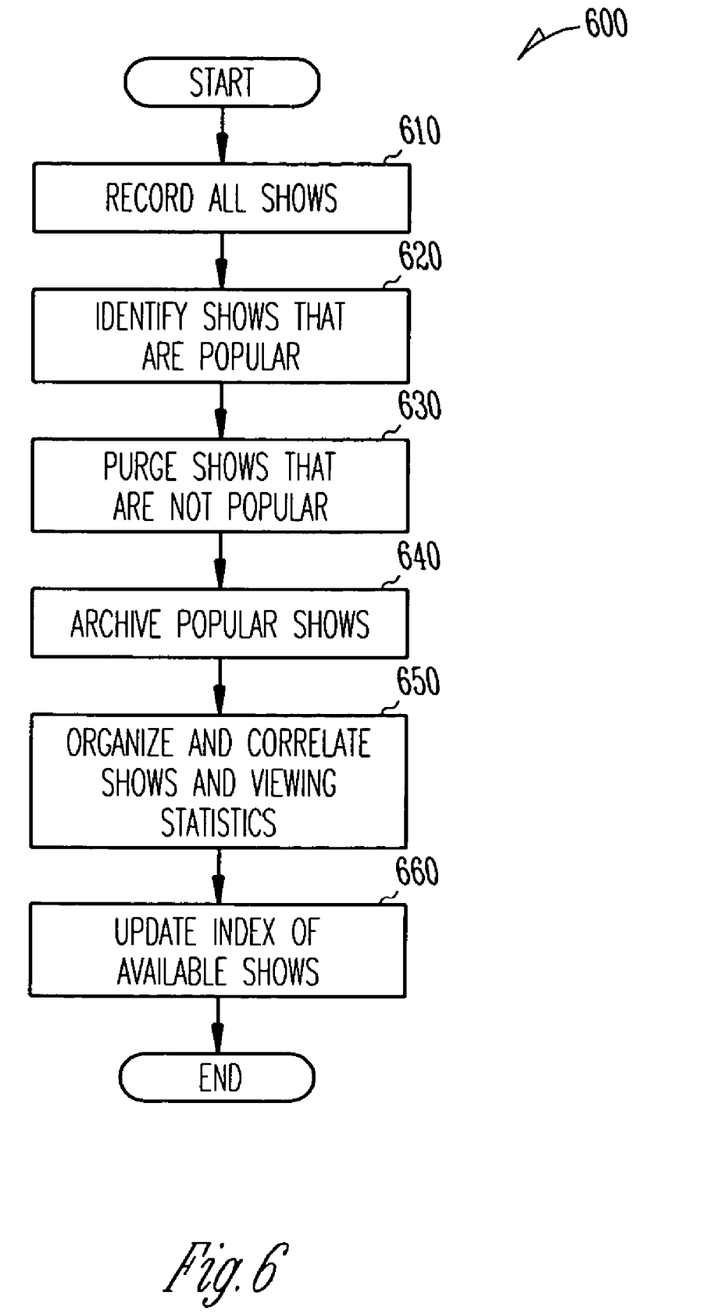

According to still another example embodiment 600 illustrated in FIG. 6, the DVR server 425 may record 610 on mass storage system 427 all the shows during a certain time period, or in an alternate embodiment at least all shows that are likely candidates to be the most popular shows, and once the top N most popular shows are identified 620, those shows which are not one of the top N most popular shows may be purged 630 from system 427. Further, in one example embodiment, the top N most popular shows may be archived 640 with a time stamp and organized based on their description (e.g., comedy, drama, etc.), from meta data. Different episodes of the same show may be correlated 650, and the popularity of a show, for example based on the number of viewers as described above, may also be stored with the show and can be provided to subscribers 250 requesting such information. The system may also define a configurable list of shows which should always be archived. After all the shows in a time period are archived and organized, the system may update 660 the index of TV shows available from DVR server 425 on demand to reflect the addition of the new top N most popular shows for the relevant time period.

Figure 7:
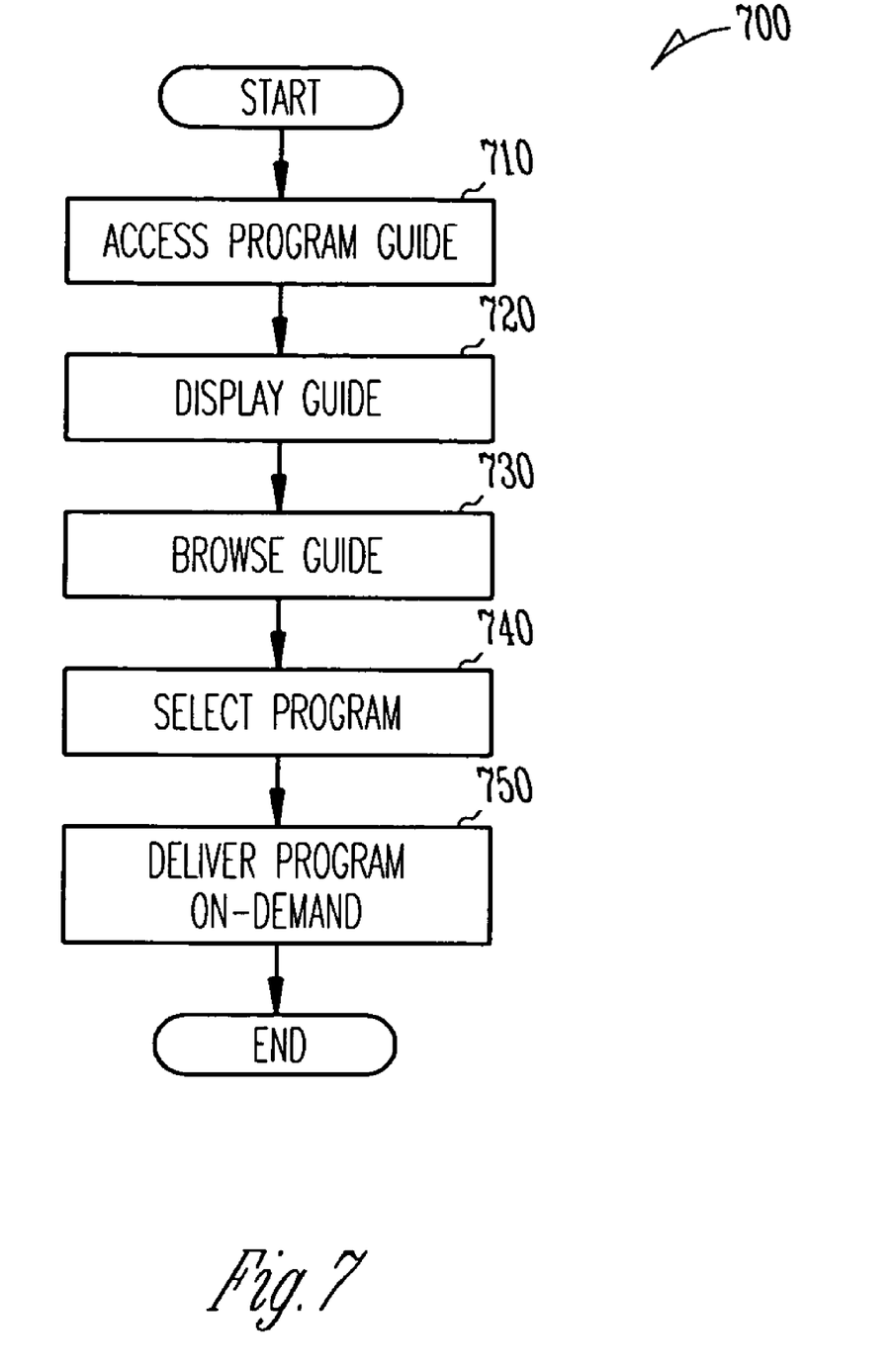

Referring now to FIG. 7, there is illustrated a flow chart of an example embodiment 700 of a method and system for TV shows on demand according to the disclosed subject matter, wherein a subscriber 250 uses STB 340 and RC 350 to access 710 an electronic program guide, as may be provided by DVR server 425 for example, to be displayed 720 on a subscriber 250 television viewing device connected to the STB 340. In one example embodiment, the electronic programming guide may provide a list of recent TV shows with a brief description, organized by date/time, category, or in other manners. For example, the programs may be organized according to what languages they are available in, for instance English or Spanish.

The subscriber 250 may then browse 730 the list or search by title, date/time, or other parameter. After the subscriber 250 locates and selects 740 the targeted show, the system delivers 750 the show to the subscriber 250 instantaneously, for example similarly to regular video-on-demand. In one example embodiment, prior to delivering the TV show, the subscriber 250's access to the DVR service is verified. In another embodiment, access to the DVR service is verified before the subscriber 250 is allowed to view the electronic program guide.

According to another example embodiment, additional intelligence can be incorporated into the systems or methods for TV shows on demand as described herein. For example, the subscriber 250 may be provided the capability to organize a list of the subscriber's 250 favorite shows. Or, a profile of each subscriber's 250 favorite shows may be provided, and an e-mail sent to the subscriber 250 with information about the favorite shows or related shows. Or, if it is detected that a subscriber 250 missed a particular episode of a show, the subscriber 250 may be notified, for example by an e-mail or by a notification presented using the subscriber's 250 TV viewing device, such as a television, with information about the particular episode and how to access it. In addition, for example, subscribers 250 may be e-mailed or otherwise notified of a daily/weekly/monthly digest of best TV shows. Of course, subscribers 250 may, in one embodiment, elect whether or not to receive the notifications.

Figure 8:
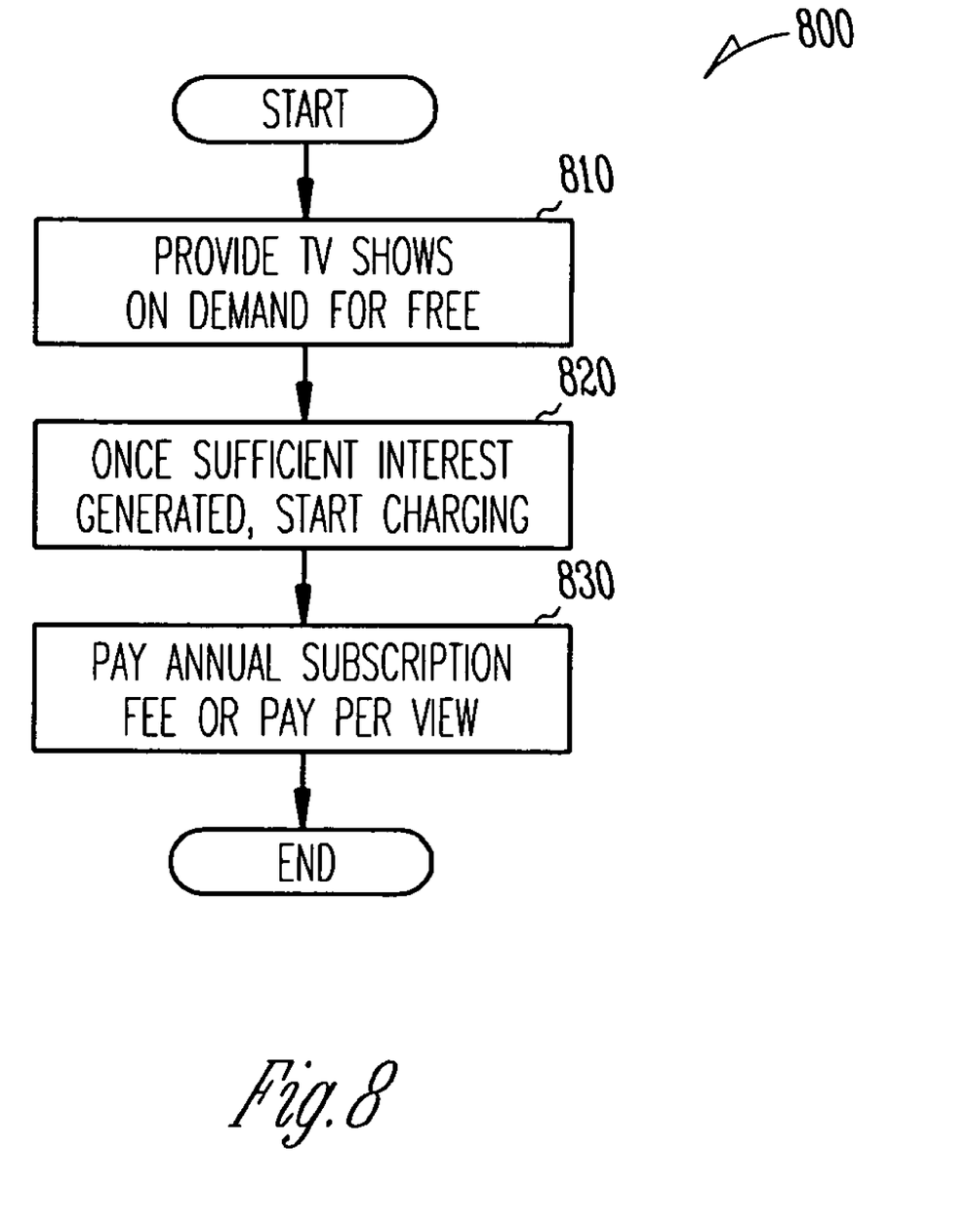

Referring now to FIG. 8, there is illustrated a method 800 for providing the TV shows on demand as described herein with a flexible pricing structure. In one embodiment, the TV shows on demand service can be provided 810 to all the system subscribers 250, for example regular subscribers 250 to TV programming, for free initially to attract audiences and to differentiate the provider's services from competing services, such as cable or satellite providers in the case where the provider uses IPTV infrastructure to deliver programming. Once a substantial number of subscribers 250 are using the service, the provider requires the subscriber 250 using the service to choose to start paying 820 for the service if they desire to keep using it. The subscriber 250 may, for example, choose to pay 830 using an annual subscription with a monthly flat-rate that provides access to all the shows, or no annual subscription fee but instead a one-time fee for each particular show the subscriber 250 desires to access on demand using the TV show on demand service. Or, alternative methods for charging the subscriber 250 may be used.

Although the system and method as described above is shown in an example form implemented in an IPTV distribution system, the disclosed system and method may, in another example embodiment, be implemented in a cable television system, in a broadcast television system, or in a satellite distribution system, or other distribution systems, for example a broadband wireless distribution system. In addition, according to another example embodiment, popular or favorite programs may be recorded using the subscriber's STB 340 instead of the DVR server 425, allowing recording of shows to take place on the edge of the distribution system.

Figure 9:
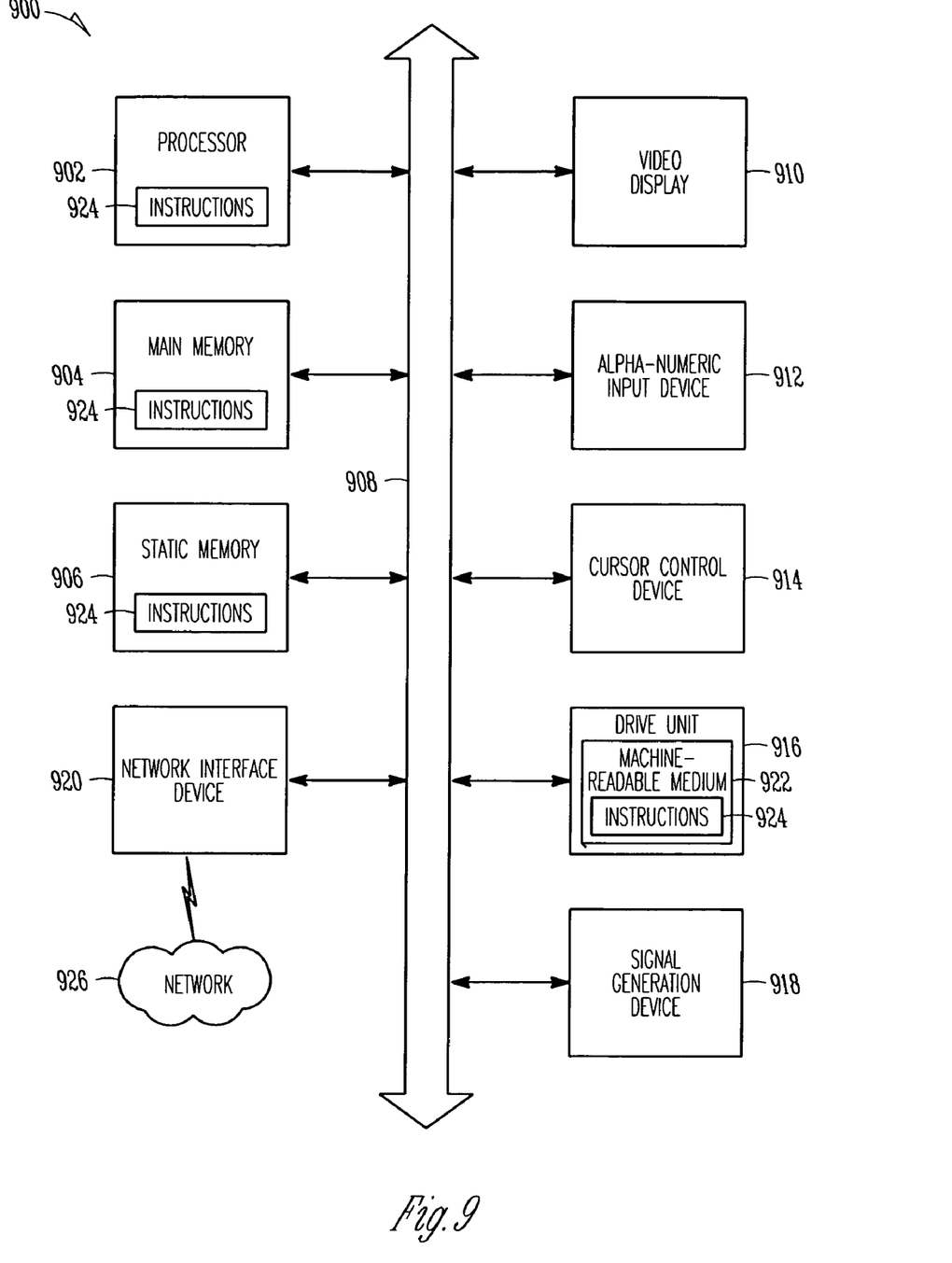
FIG. 9 illustrates an example embodiment of a computing system in accordance with the disclosed subject matter.

Referring now to FIG. 9, a diagrammatic representation of a machine is shown in the example form of a computer system 900 of a type sufficient for use in any of the example embodiments set forth herein. System 900 may include a set of instructions for causing the machine to perform any one or more of the methodologies discussed herein, that may be executed. In alternative embodiments, the machine operates as a standalone device or may be connected (e.g., networked) to other machines. In a networked deployment, the machine may operate in the capacity of a server, a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904, and/or within the processor 902, during execution thereof by the computer system 900. The main memory 904 and the processor 902 also constituting machine-readable media.

The software 924 may further be transmitted or received over a network 926 via the network interface device 920 utilizing any one of a number of well-known transfer protocols, for example, the hyper text transfer protocol (HTTP). While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the disclosed subject matter, or that is capable of storing, encoding, or carrying data structures utilized by or associated with such a set of instructions. The term "machine-readable medium" shall accordingly be taken to include, but not be limited to, solid-state memories, optical and magnetic media.

Although the present specification describes components and functions implemented in the embodiments with reference to particular standards and protocols, the disclosed subject matter may be not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Thus, various example embodiments of the systems and methods described herein may provide a variety of benefits to subscribers 250 and providers. For example, the provider may offer a new value-added service, such as TV shows on demand, which enables subscribers 250 to view any popular TV shows anytime and at any occasion they want without the burden and cost of purchasing/organizing DVDs or using a DVR. In addition, the systems or methods hereof may mitigate one or more of the practical limitations imposed by DVRs, such as limited storage capacity or the need to identify favorite TV shows in advance, or the possible inability of a IPTV infrastructure to deliver more than a limited number of TV shows at one time to a subscriber 250, therefore limiting the subscribers 250 ability to record shows simultaneously, which may be particularly problematic for high definition (HD) programming. In addition, the systems and methods may eliminate the need for a consumer to know in advance which TV shows he or she may enjoy, but instead can access such shows after they are broadcast by looking at the program guide to see which shows were popular.

Thus, as described above, the systems and methods described herein provide for time shifting of television broadcasts. As described above in various embodiments, the system and method provides for recording broadcast programming on one or more servers in the distribution system remotely from the subscribers 250, and rebroadcast of the programming on demand to time-shift it from the originally scheduled time to a time desired by the subscriber 250. In another embodiment, the programs may be recorded using the subscriber 250's set top box. Subscribers 250 are therefore provided greater flexibility in viewing programming without the additional cost and logistics required if they use a personal DVR located on their premises. While the example embodiments herein are generally illustrated in the environment of an IPTV system, in an alternative embodiment a cable distribution system or satellite distribution system may be used instead. Such a system may or may not use IPTV methodologies. Other available distribution techniques may be used instead, such as frequency modulation or each channel in a television frequency band, or time division or orthogonal frequency division multiplexing, for example only and not by way of limitation. Further, the IPTV may be delivered over-the-air using, for example, broadband wireless telecommunications techniques.

Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

The invention claimed is:

1. A method at a processor in a television programming distribution system comprising:
    automatically identifying the N most popular television programs based on monitoring in real time a viewing of television programs on a program by program basis by at least some subscribers of the distribution system delivering the television programs to a plurality of subscribers;
    automatically storing all of the identified N most popular television programs in the television programming distribution system at a video hub office (VHO) remotely from the plurality of subscribers;
    purging programs that are not the N most popular television programs;
    delivering at least one of the stored popular television programs to at least one of the subscribers upon request of the subscriber;
    archiving the N most popular television programs; and updating an index of available shows that are available on demand that reflect an addition of new top N most popular shows for a relevant time period.

2. A method according to claim 1 including delivering at least one of the stored popular television programs to the plurality of the subscribers upon request of the subscriber, archiving the N most popular television programs with a time stamp, organizing the N most popular television programs based on a description extracted from metadata, and presenting statistics of the popularity of the N most popular television programs upon request of the subscriber.

3. A method according to claim 1 including storing the popular television programs at the premises of at least one of the subscribers.

4. A method according to claim 1 including storing the popular television programs using a network-based recording device.

5. A method according to claim 1 further wherein stored television programs are automatically stored remotely from the subscribers in the distribution system, wherein channel-change requests sent from a plurality of set top boxes to the distribution system is used to determine an overall viewing of a particular show to identify popular television programs.

6. A method according to claim 1 further including organizing programs for display in an electronic program guide according to one or more parameters selected from the group of: date of a program, type of the program, name of a program series for the program, the language the program is offered in, or the most popular programs.

7. A method according to claim 1 further including determining the most popular programs in one or more categories selected from the group: demographic factors, geographical location of subscribers, time of day, time of week, or type of program.

8. A method according to claim 1 further including at least one of the subscribers paying one or more providers of the television programs a subscription fee for the right to obtain one or more of the stored television shows on demand during a period of time or a pay-per-view fee for the right to obtain delivery of at least one television show on demand.

9. A method according to claim 1 further including at least one of the subscribers paying a subscription fee for the right to obtain one or more of the stored television shows on demand during a period of time or a pay-per-view fee for the right to obtain delivery of at least one television show on demand.

10. A method according to claim 1 further including stored television programs being stored, at least in part, under the control of a server system located remotely of the subscribers in the distribution system.

11. A method according to claim 1 further including monitoring the viewing of television programs of at least some of the subscribers in the distribution system in order to determine the most popular television programs.

12. A method according to claim 11 further including determining the most popular television programs from information obtained by the monitoring of viewing and determining a total number of current viewers per program from the distribution system.

13. A method according to claim 1 further including delivering television programs to subscribers using an Internet protocol television (IPTV) distribution system.

14. A method according to claim 1 further including ranking the N most popular television programs, where N is an integer and is a configurable parameter.

15. A method according to claim 14 further including recording a plurality of television programs during a time period, and later deleting at least some of the recorded television programs if they are not among the N most popular television programs as determined by monitoring the viewing of the plurality of television programs.

16. A method according to claim 1 further including offering to one of the subscribers among a plurality of subscribers at separate locations at least one of the subscriber's favorite television programs among the most popular television programs determined at the video hub office (VHO) for the subscriber to select to have delivered to the subscriber.

17. A method according to claim 1 further including notifying a subscriber of a recorded television program.

18. A method according to claim 1 further including notifying a subscriber of a popular recorded television program stored at the video hub office (VHO), wherein channel-change requests sent from a plurality of set top boxes to the VHO is used to determine and identify popular television programs.

19. A method according to claim 1 further including delivering a recorded television program to one of the subscribers using a cable television system or a satellite television system.

20. An article of manufacture comprising at least one machine readable data storage medium having stored thereon a plurality of N most popular television programs identified and recorded in digital form in a distribution system delivering television programs to a plurality of subscribers upon request of at least one of the plurality of subscribers, wherein the N most popular television programs are identified by monitoring the viewing of the programs substantially in real time and wherein the popular television programs are stored automatically in the television distribution system at a video hub office (VHO) remotely from the plurality of subscribers, and wherein programs that are not the N most popular television programs for a given time period are purged from the distribution system.

21. An article of manufacture comprising at least one machine readable storage medium having one or more computer programs stored thereon and operable on one or more computing systems to: a) automatically identify popular television programs based on the viewing of television programs by at least some of the subscribers of a distribution system; b) cause the automatically identified popular television programs to be stored for later viewing on demand upon a subscriber request, wherein the identified popular television programs are stored automatically in the television distribution system at a video hub office (VHO) remotely from the plurality of subscribers; c) archive the N most popular television programs; and d) purge programs that are not the N most popular television programs for a given time period.

22. An article according to claim 21 wherein the one or more computer programs are further operable on the one or more computer system to offer at least one identified popular television program to one or more of the subscribers for the one or more subscribers to request on-demand.

23. An article according to claim 22 wherein the one or more computer programs are further operable on the one or more computer systems to at least in part cause at least one identified popular television program to be delivered to at least one of the subscribers.

24. A method at a processor in an Internet Protocol television distribution system comprising:
detecting at least one request from a subscriber among a plurality of subscribers of the distribution system requesting at least one television program on-demand from a video hub office (VHO); and
wherein the at least one television program is automatically identified in real time as a popular television program based on the viewing of television programs by at least some of other remote or unaffiliated subscribers of the distribution system as determined from the perspective of the VHO in the Internet Protocol television distribution system and wherein the identified popular television programs are stored automatically in the IPTV television distribution system at the VHO remotely from the plurality of subscribers; and purging programs that are not identified as popular television programs for a given time period; and update an index of available programs that are available on demand that reflect an addition of new popular television programs for the given time period.

25. A method according to claim 24 further including displaying an electronic program guide to at least one subscriber, wherein the electronic program guide lists the identified popular television programs according to at least one category selected from the group of: type of a program, the name of the series for the program, or the date of the program.

26. A method comprising:
automatically identifying popular television programs in real time based on the viewing of television programs by a plurality of unaffiliated subscribers at different separate physical locations of a distribution system wherein the identified popular television programs are stored automatically in the distribution system at a video hub office (VHO) remotely from the unaffiliated subscribers;

distributing at least one of the identified popular television programs upon detecting at least one request from a subscriber among a plurality of subscribers of the distribution system requesting at least one television program on-demand from the VHO;

purging programs that are not identified popular television programs for a given time period;

updating an index of available shows that are available on demand that reflect an addition of new top N most popular shows for a relevant time period; and wherein the viewing of the television programs is determined from information obtained from one or more of the locations selected from the group: the subscriber's set top box, a residential gateway or a server used at least in part to deliver the television programs to subscribers.

27. A system comprising one or more computers programmed to:
automatically identify popular television programs in real time based on viewing of television programs by at least some unaffiliated subscribers at separate and different locations of a distribution system delivering the television programs from a video hub office (VHO);

automatically cause one or more of the identified popular television programs to be stored and archived wherein the identified popular television programs are stored automatically in the distribution system remotely from the unaffiliated subscribers;

purge programs that are not the identified popular television programs;

update an index of available shows that are available on demand that reflect an addition of new identified popular television programs for a relevant time period and deliver at least one of the stored popular television programs from the VHO to at least one of the subscribers upon request of the subscriber, wherein channel-change requests sent from a plurality of set top boxes to the VHO is used to determine and identify popular television programs.

28. A system according to claim 27 further including at least one mass storage device located remotely from the unaffiliated subscribers and further wherein the stored television programs are stored on the mass storage device.

29. A system according to claim 27 further wherein the one or more computers are programmed to organize television programs for display in an electronic program guide according to one or more parameters selected from the group of: date of a program, type of the program, name of the program series, the language the program is offered in, or the most popular programs.

30. A system comprising one or more computers located in a distribution system used to deliver television programs to subscribers, wherein the computers are programmed to:
automatically identify in real time popular television programs based on monitoring a viewing of television programs by at least some unaffiliated subscribers at different and separate locations of a distribution system delivering the television programs;

automatically cause one or more of the identified popular television programs to be stored wherein the identified popular television programs are stored automatically in the distribution system at a video hub office (VHO) remotely from the subscribers;

purge programs that are not identified as popular television programs;

update an index of available programs that are available on demand that reflect an addition of new popular television programs for a given time period; and cause to be delivered at least one of the stored popular television programs from the VHO to at least one of the unaffiliated subscribers upon request of the subscriber.

31. A system comprising one or more computers located at a premises of a first subscriber served by a distribution system used to deliver television programs to the subscriber's premises, wherein the computers are programmed to:
identify popular television programs based on monitoring at a video hub office (VHO) in real time a viewing of television programs by at least some subscribers of the distribution system at a plurality of separate premises;

automatically cause one or more of the identified popular television programs to be stored wherein the identified popular television programs are stored automatically in the distribution system remotely from the premises of the subscribers;

purge programs that are not identified as popular television programs;

update an index of available programs that are available on demand that reflect an addition of new popular television programs for a given time period; and cause to be delivered at least one of the stored popular television programs from the VHO to at least one of the subscribers upon request of the subscriber.

32. A system according to claim 31 including a storage device in the first subscriber's premises, wherein the storage device stores at least one of the identified popular television programs.

* * * * *